United States Patent
Tailliet

(10) Patent No.: US 12,470,058 B2
(45) Date of Patent: Nov. 11, 2025

(54) PROTECTION OF AN INTEGRATED CIRCUIT AGAINST ELECTROSTATIC DISCHARGES

(71) Applicant: STMicroelectronics International N.V., Geneva (CH)

(72) Inventor: Francois Tailliet, Fuveau (FR)

(73) Assignee: STMicroelectronics International N.V., Geneva (CH)

( * ) Notice: Subject to any disclaimer, the term of this patent is extended or adjusted under 35 U.S.C. 154(b) by 102 days.

(21) Appl. No.: 18/512,292

(22) Filed: Nov. 17, 2023

(65) Prior Publication Data

US 2024/0170960 A1    May 23, 2024

(30) Foreign Application Priority Data

Nov. 21, 2022    (FR) ...................................... 2212105

(51) Int. Cl.
   *H02H 9/04*    (2006.01)
(52) U.S. Cl.
   CPC .................. *H02H 9/046* (2013.01)
(58) Field of Classification Search
   CPC .... H02H 9/046; H10D 89/611; H10D 89/911; H10D 89/921
   USPC ......................................................... 361/56
   See application file for complete search history.

(56) References Cited

U.S. PATENT DOCUMENTS

| | | | | |
|---|---|---|---|---|
| 5,825,600 | A * | 10/1998 | Watt ..................... | H10D 89/601 361/111 |
| 7,288,450 | B1 * | 10/2007 | Tailliet .................. | H10D 89/60 438/210 |
| 11,228,174 | B1 * | 1/2022 | Fairbanks ............ | H10D 89/811 |
| 11,251,176 | B2 * | 2/2022 | De Raad ............... | H02H 9/046 |
| 11,282,831 | B2 * | 3/2022 | Peng ....................... | H10D 8/80 |
| 12,148,746 | B2 * | 11/2024 | Hsu ....................... | H10D 89/921 |
| 2001/0024348 | A1 * | 9/2001 | May ..................... | H10D 89/921 361/56 |
| 2003/0151877 | A1 * | 8/2003 | Young .................. | H10D 89/921 361/212 |
| 2012/0236444 | A1 * | 9/2012 | Srivastava ............. | H02M 1/32 361/56 |
| 2018/0183233 | A1 * | 6/2018 | De Raad ............... | H10D 89/921 |

(Continued)

FOREIGN PATENT DOCUMENTS

EP    3340298 A1 *    6/2018    ............. H02H 9/041

*Primary Examiner* — Dharti H Patel
(74) *Attorney, Agent, or Firm* — Crowe & Dunlevy LLC

(57) ABSTRACT

An ESD protection circuit includes a first voltage limiter having a first input terminal electrically coupled to each first signal pad of an integrated circuit by a first diode mounted in reverse bias during the integrated circuit operation. The first voltage limiter is mounted to be conductive between each first signal pad and ground during a positive ESD on the first signal pad. A second voltage limiter is electrically coupled and mounted to be conductive in the same direction as the first voltage limiter, between an external power supply pad and ground. An internal node outputs an internal power supply voltage to the domain, and is passed through by a current in response to a positive ESD on the power supply pad which is lower than the current passing through the first voltage limiter. A blocking diode is electrically connected between the first input terminal and the power supply pad.

13 Claims, 4 Drawing Sheets

(56) References Cited

U.S. PATENT DOCUMENTS

| | | | |
|---|---|---|---|
| 2023/0178980 A1* | 6/2023 | Gutsul | H02H 9/042 |
| | | | 361/56 |
| 2023/0223394 A1* | 7/2023 | Stockinger | H10D 89/611 |
| | | | 361/56 |
| 2024/0250526 A1* | 7/2024 | Ahammed | H10D 89/611 |
| 2025/0174987 A1* | 5/2025 | Domanski | H10D 89/911 |

* cited by examiner positive discharge between PD1 and PD3 positive discharge between PD3 and PVss negative discharge between PD1 and PVss positive discharge between PVcc and PVss

PROTECTION OF AN INTEGRATED CIRCUIT AGAINST ELECTROSTATIC DISCHARGES

PRIORITY CLAIM

This application claims the priority benefit of French Application for Patent No. 2212105, filed on Nov. 21, 2022, the content of which is hereby incorporated by reference in its entirety to the maximum extent allowable by law.

TECHNICAL FIELD

The invention relates to electronic devices and, in particular, to devices configured for the protection of an integrated circuit against electrostatic discharge (ESD), for example but not limited to those configured to protect integrated circuits of non-volatile memories in particular of the electrically erasable programmable read only memory (EEPROM) type.

BACKGROUND

An integrated circuit can include: input/output pads configured to receive and/or transmit electrical signals and connected to a domain of the integrated circuit implementing a particular functionality, such as for example a non-volatile memory device of the EEPROM type; a power supply pad configured to receive a power supply voltage from which the domain can be supplied; and a ground pad.

When the integrated circuit is not in operation, it may be subjected to an electrostatic discharge which may occur between any two pads among those mentioned above.

An electrostatic discharge typically results in a very brief current pulse (typically around a hundred nanoseconds) whose current peak is around 2 amperes, for example, and typically occurs after 10 nanoseconds. Typically, such a current peak occurs, for example, for an impulse potential difference of 3 kV HBM applied between two pads through an equivalent R-L-C circuit.

The "Human Body Model" (HBM) is well known to the person skilled in the art in the field of protection against electrostatic discharges and designates in particular an electrical circuit aimed at modelling an electrostatic discharge output by a human being and usually used to test the sensitivity of the devices to electrostatic discharges. This HBM electrical circuit, which is the equivalent R-L-C circuit mentioned above and to which a high voltage is applied (for example 3 kV), includes in particular a capacitor charged under this high voltage and which will be discharged through a resistance of 1.5 kilo-ohms in the device under test. Thus, in the present case, an electrostatic discharge of 3 kilovolts HBM circuit that a potential difference of 3 kilovolts is applied to the HBM electrical circuit.

This current pulse should then circulate through a circuit for protecting against electrostatic discharges and not through the domain of the integrated circuit to be protected.

This protection circuit consequently aims at absorbing this current pulse and at avoiding overvoltages on the pads of the integrated circuit.

An ESD protection circuit occupies a lot of space on an electronic chip, due to the need to sustain a high energy without destruction.

Thus, the higher the expected level of ESD protection, the greater the surface occupied by the ESD protection (protection circuit, interconnections).

And reducing ("shrinking") the lithography does not contribute to significantly reducing this surface.

Indeed, with increasingly small lithographs, it is the surface of the functional circuits of the domain(s) of the integrated circuit which decreases, and not the surface of the ESD protection.

However, the ESD protection circuit has a significant and increasing impact on the surface of the chip and on its cost.

For example, in some technologies, ESD protection can occupy nearly 5% of the chip area.

On the other hand, for memory integrated circuits, the lower the memory density, the more significant the relative contribution of the ESD protection to the total size of the chip.

Thus, in some cases, a conventional ESD protection can occupy nearly 15% of the surface of the chip.

It is therefore necessary to maximize the ESD performance/ESD protection surface ratio.

This can be obtained either by reducing the total cost of the ESD protection surface for the same given ESD performance, or by increasing the performance of the ESD protection for the same surface cost.

In order to try to solve this problem, the ESD protection circuits have been using diodes, bipolar transistors, thyristors, MOS switches (MOSSWI), and the like, for decades.

The bipolar protections are typically individual per pad, and connected to a common ground rail.

The MOSSWI type protections are connected between the power supply pad and the ground pad, and each input/output pad is connected by two diodes to the power supply pad and the ground pad respectively.

The bipolar protections generally offer better a ESD robustness per surface than the MOSSWI type protections, due to the intrinsic negative resistance of their current-voltage curve induced by the bipolar operation (while the MOSSWI switches are based on the usual MOSFET conduction), but their threshold, related to the avalanche conduction of the P-N diodes (typically not less than 6V) cannot be made as low as the thresholds of the MOSSWIs, which makes them unsuitable for advanced technologies requiring trigger levels below 2V.

Moreover, one NPN bipolar transistor is typically provided per pad (except for the ground pad), which takes up a lot of surface area.

As for the protections of the MOSSWI type, such a switch often takes up more space than a NPN bipolar structure.

It is possible to pool the switches for several pads by using diodes, but this can lead to preventing, when the integrated circuit is in operation, the voltage present on the input/output pads from exceeding the value of the power supply voltage increased by 0.6 V (which corresponds to the threshold voltage of a diode).

However, this limitation of the voltage on the input/output pads poses a problem when several chips are connected to an I²C type bus.

Indeed, if one of the chips is stopped (zero power supply voltage), then the wires of the bus which are connected on the input/output pads of this chip have a voltage limited to 0.6V which blocks the operation of the bus for the other chips because certain signals of the bus must have a voltage higher than 0.6V.

Finally, a MOSSWI-type protection contributes unfavorably to the chip's standby current (Isc standby) in the presence of a significant leakage current (Ioff) of the NMOS transistors.

There is therefore a need for a good ESD protection with a maximum surface gain and a possibility of offering, during the operation of the integrated circuit, a voltage on the input/output pads which is not limited to the power supply voltage increased by the threshold voltage of a diode.

SUMMARY

According to one embodiment, it is proposed to pool a single common voltage limiting element for all input/output, power supply and ground pads, connected between a common node and the ground pad.

Thus, a surface gain is obtained and all pads, including the power supply pads, share the same connection to the discharge path.

More specifically, current is injected into the voltage limiting element through a diode in direct conduction, if the considered pad receives a positive electrostatic discharge, while current is injected into a rail connected to the ground pad, if the considered pad receives a negative electrostatic discharge.

According to one embodiment, a pooling at the diodes is also proposed. Indeed, it is proposed to implement a pair of diodes per input/output or power supply pad, with homologous diodes of the pairs having a common anode connected to the ground pad and the other homologous diodes of the pairs having a common cathode connected to the terminal of the voltage limiting element which is not connected to the ground pad.

Thus, the input/output and power supply pads use the same ESD scheme and the diodes are much smaller than the common voltage limiting element.

Moreover, according to one embodiment, there is a diode connected directly between the power supply pad and the input of the common voltage limiting element, which allows avoiding capping, in operation, the voltage on each input/output pad at the power supply voltage increased by the threshold voltage of a diode, which is particularly useful in the case of a connection of the integrated circuit on an I$^2$C bus.

Furthermore, according to one embodiment, a second voltage limiting element is connected in series with a resistor between the power supply pad and the ground pad, and is advantageously passed through, during an electrostatic discharge, by a lower current density than that passing through the common voltage limiting element.

The input terminal of this second voltage limiting element is the power supply terminal of the domain of the integrated circuit and, in the presence of an electrostatic discharge between the power supply pad and the ground pad, the voltage present at this input terminal is limited to a level lower than the voltage level present on the power supply pad and induced by the common current limiting element.

The level of ESD protection is therefore improved.

According to one aspect, an integrated circuit is proposed, comprising several first signal input and/or output pads, a domain of the integrated circuit coupled to said first pads, at least one second pad configured to receive a respective first power supply voltage, at least one third pad configured to be coupled to a cold feed point, for example ground.

The integrated circuit also comprises a circuit for protecting said domain against electrostatic discharge.

The protection circuit includes a first voltage limiting module having a first input terminal which is electrically coupled to each first pad by a first diode mounted so as to be reverse biased during the operation of the integrated circuit.

This first voltage limiting module is configured to be mounted conductive between each first pad and said at least one third pad during a positive electrostatic discharge on one of the first pads.

The protection circuit also includes at least one second voltage limiting circuit (including for example a second voltage limiting module connected in series with a resistor) which is electrically coupled between said at least one second pad and said at least one third pad.

When several second voltage limiting circuits are provided, it is possible in theory to have several distinct third pads, but in practice these third pads can in this case be combined to form a single third pad.

Each second voltage limiting circuit is configured to be mounted conductive between the corresponding second pad and the corresponding third pad during a positive electrostatic discharge on this second pad.

This second voltage limiting circuit has an internal node capable of outputting a second power supply voltage to said domain.

This second power supply voltage is an internal power supply voltage effectively powering the domain of the integrated circuit and is lower than the first power supply voltage, in particular during a positive electrostatic discharge on the second pad.

During operation of the integrated circuit, these two voltages are very close and the difference is preferably as small as possible (for example in the range of a few tens of mV) so as not to disturb the operation of the integrated circuit.

This second voltage limiting circuit is also configured, in the presence of a positive electrostatic discharge on the corresponding second pad, to be passed through by a current which is lower than the current passing through the first voltage limiting module.

The protection circuit further comprises a second diode which is electrically connected between said first input terminal of the first voltage limiting module and said at least one second pad, that is to say the power supply pad so as to be forward-biased between said at least one second pad and the first input terminal of the first voltage limiting module during a positive discharge on the corresponding second pad.

Since the first input terminal of the first voltage limiting module is coupled to each first pad via a first diode, this second diode, which acts as a blocking diode, is also coupled to each first pad, the term "coupled" encompassing a direct or indirect coupling.

As indicated above, this second diode allows avoiding capping, in operation, the voltage on each input/output pad at the power supply voltage increased by the threshold voltage of a diode, which is, as mentioned above, particularly useful in the case of connection of the integrated circuit on an I$^2$C bus.

According to one embodiment, the protection circuit comprises first pairs of first diodes which are connected in parallel and respectively associated with the first pads, each first pair including two first diodes connected in series in the same direction, the common terminal of the two first diodes being coupled to the corresponding first pad.

Furthermore, the first voltage limiting module is connected in parallel with the first pairs of diodes.

The protection circuit also includes a second pair of second diodes connected in parallel with the voltage limiting circuit module, the two second diodes being connected in series in the same direction as the first diodes, the common terminal of the two second diodes being electrically coupled to said at least one second pad.

Furthermore, the second voltage limiting circuit includes a second voltage limiting module connected in series with a resistive element, the common terminal between the resistive element and the second voltage limiter forming a second input terminal for this second voltage limiting module as well as said internal node.

Furthermore, the anodes of all diodes having their cathode connected either to a first pad or to said at least one second pad, are electrically coupled to said at least one third pad.

According to one embodiment, the protection circuit comprises a first discharge rail coupled to said input terminal of the first voltage limiting module and to the cathodes of all diodes having their anode coupled either to a first pad or to the second pad, and a second discharge rail coupled to the third pad and to the anodes of all diodes having their cathode connected either to a first pad or to said at least one second pad.

The first voltage limiting module and said at least one second voltage limiting module can have a similar structure.

According to one embodiment, the first voltage limiting module includes at least one first lateral bipolar transistor whose collector forms said first input terminal, whose transmitter is coupled to the third pad and whose base is connected to the third pad by a first base resistor, and each second voltage limiting module includes at least one second lateral bipolar transistor whose collector forms said second input terminal, whose transmitter is coupled to the corresponding third pad and whose base is connected to the corresponding third pad by a second base resistor Said at least one second voltage limiting module advantageously has a space requirement which is smaller that of the first voltage limiting module.

In particular, the first voltage limiting module can include N1 first transistors in parallel, N1 being greater than 1 and said at least one second voltage limiting module can include N2 second transistors in parallel, N1 being greater than N2.

Said domain of the integrated circuit can include, for example, a non-volatile memory circuit.

According to another aspect a method is proposed, comprising: in the presence of a positive electrostatic discharge on one of the first signal input and/or output pads coupled to a domain of the integrated circuit, limiting the voltage on this first pad by circulating the current resulting from this discharge through a first voltage limiting module; in the presence of a positive electrostatic discharge on a second pad configured to receive, during the operation of the integrated circuit, a first power supply voltage, limiting the voltage on the input terminal of at least one second voltage limiting module by distributing the current resulting from this discharge into, on the one hand, a first current circulating in the first voltage limiting module and in a blocking diode coupled between the second pad, the first pad and the input of the first voltage limiting module and, on the other hand, at least one second current circulating in said at least one second voltage limiting module, said at least one second current being lower than the first current; and during the operation of the integrated circuit, outputting, to said domain, of at least one second power supply voltage equal to the voltage present at said input terminal of said at least one second voltage limiting module.

According to one mode of implementation, said at least one second current also circulates in a resistive element coupled between said input terminal of the corresponding second current limiting module and the second pad.

BRIEF DESCRIPTION OF THE DRAWINGS

Other advantages and features of the invention will appear on examining the detailed description of implementations and embodiments, without limitation, and of the appended drawings in which.

DETAILED DESCRIPTION

Figure 1:
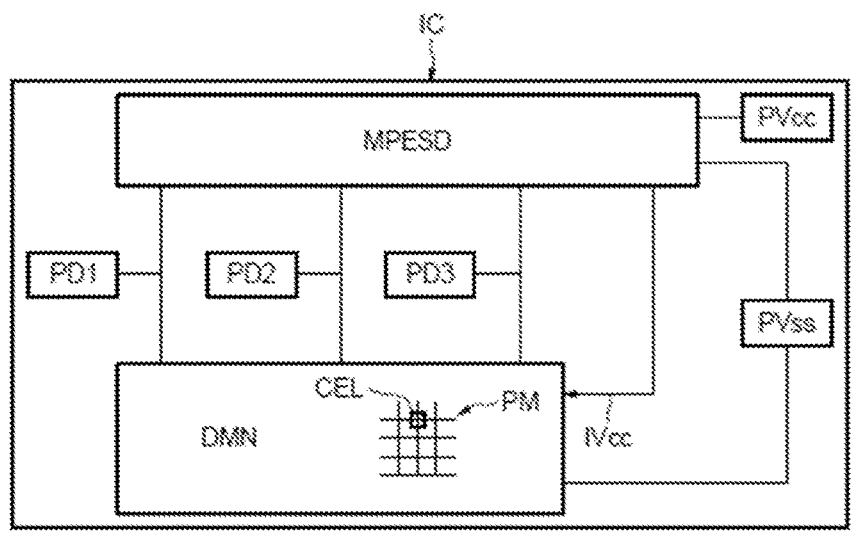
FIG. 1 shows a block diagram of an integrated circuit including a non-volatile memory device of the EEPROM type.

In FIG. 1, the reference IC designates an integrated circuit including a domain DMN here including a circuit forming a non-volatile memory device of the EEPROM type having in particular a memory area PM of cells CEL of the EEPROM type as well as processing circuit (not represented here for the purposes of simplification) including in particular a row decoder and a column decoder.

The integrated circuit IC includes several first signal input and/or output pads. In this exemplary embodiment and for simplification purposes, three first pads PD1, PD2 and PD3 are represented.

The domain DMN is connected to these first pads PDi.

The integrated circuit also includes a second pad PVcc configured to receive a first power supply voltage Vcc and a third pad PVss configured to be coupled to a cold feed point, typically ground.

The integrated circuit IC also comprises a circuit MPESD for protecting the domain DMN against electrostatic discharges.

As will be seen in more detail below, the protection circuit MPESD is, in particular, configured to, during operation of the integrated circuit IC, output a second power supply voltage IVcc which is an internal power supply voltage, drawn from the external power supply voltage Vcc, configured to power the domain DMN.

As will be seen in more detail below, the value of this internal power supply voltage IVcc is lower than the value of the external power supply voltage Vcc, in particular during a positive electrostatic discharge on the second pad.

During the operation of the integrated circuit, these two voltages are very close and the difference is preferably as small as possible (for example in the range of a few tens of mV) so as not to disturb the operation of the integrated circuit.

The protection circuit MPESD is moreover connected to the first pads PD1-PD3, to the second pad PVcc and to the third pad PVss.

Figure 2:
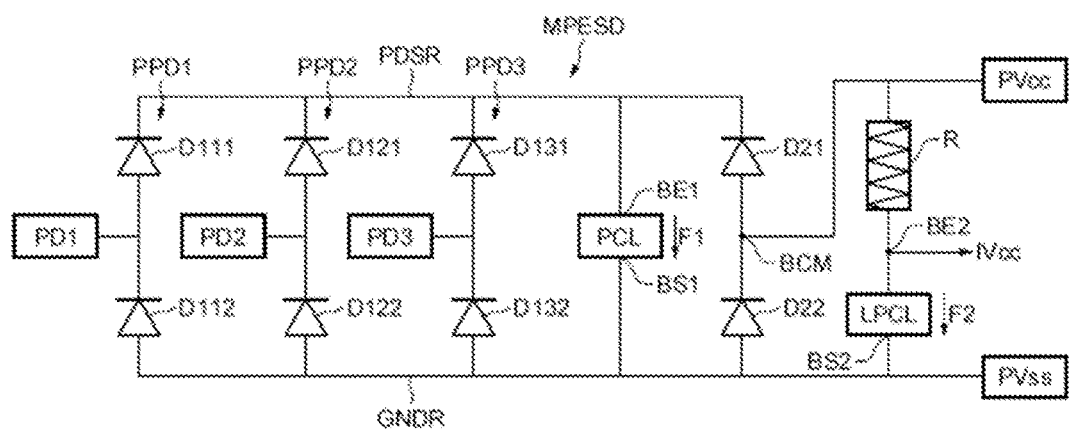
FIG. 2 illustrates an embodiment of a protection circuit.

Reference is now made more particularly to FIG. 2 to describe an embodiment of the protection circuit MPESD.

The protection circuit MPESD includes first pairs PPDi of first diodes respectively associated with the first pads PDi.

More specifically, the first pair PPD1 of first diodes which is associated with the pad PD1 includes the two diodes D111 and D112.

The second pair PPD2 of first diodes which is associated with pad PD2 includes the two diodes D121 and D122 and the third pair PPD3 of first diodes which is associated with pad PD3 include the two diodes D131 and D132.

These first pairs are connected in parallel.

The first two diodes of each first pair are connected in series in the same direction.

The common terminal of the first two diodes is electrically coupled to the corresponding first pad.

More specifically, the common terminal of the first two diodes D111 and D112, which is the anode of the diode D111 and the cathode of the diode D112, is connected to the first pad PD1.

The common terminal of the first two diodes D121 and D122, which is the anode of the diode D121 and the cathode of the diode D122 is connected to the first pad PD2.

The common terminal of the first two diodes D131 and D132 which is the anode of the diode D131 and the cathode of the diode D132 is connected to the first pad PD3.

The cathodes of all first diodes D111, D121 and D131 having their anode connected to the corresponding first pad PD1, PD2, PD3, are connected together on a first discharge rail, for example a metallization, PDSR.

The anodes of all first diodes D112, D122, D132 having their cathode connected to the corresponding first pad PD1, PD2, PD3 are all connected on a second discharge rail GNDR, for example also a metallization, connected to the third pad PVss.

The protection circuit MPESD also includes a first voltage limiting module PCL, of which an example of structure will be described in more detail below, having a first input terminal BE1 connected on the first discharge rail PDSR and a first output terminal BS1 connected on the second discharge rail GNDR.

The first voltage limiting module PCL is configured so as to be mounted conductive in the direction from a first pad PDi to the third pad PVss during a positive electrostatic discharge on one of the first pads PDi, the conducting direction being indicated in FIG. 2 by the arrow F1.

The protection circuit MPESD also includes a second pair of second diodes D21 and D22, this second pair being connected in parallel with the first voltage limiting module PCL and therefore also in parallel with the first pairs of first diodes mentioned above.

The two diodes D21 and D22 are connected in series in the same direction as the two first diodes of each first pair of first diodes.

In other words, the cathode of the second diode D21 is connected to the first input terminal BE1 of the first voltage limiting module PCL and the anode of the second diode D22 is connected to the second discharge rail GNDR.

The common terminal BCM of these two second diodes D21 and D22, that is to say the anode of the diode D21 and the cathode of the diode D22, is connected to the second pad PVcc.

As will be seen in more detail below, the second diode D21 forms a blocking diode allowing, during the operation of the integrated circuit, limiting the voltage on each first pad PDi to a voltage much higher than the external power supply voltage Vcc.

The protection circuit MPESD also includes a second voltage limiting circuit connected between the second pad PVcc and the third pad PVss.

This second voltage limiting circuit here comprises a resistor R connected in series with a second voltage limiting module LPCL.

The second voltage limiting module LPCL is configured, during a positive electrostatic discharge on the second pad PVcc, to be conductive in the same direction as the first voltage limiting module. In this case, the conducting direction illustrated by the arrow F2 in FIG. 2 goes from the second pad PVcc to the third pad PVss.

The second voltage limiting module LPCL therefore also gives the second voltage limiting circuit the conducting direction illustrated by the arrow F2.

The common terminal of the resistor R and of the second voltage limiting module LPCL forms the input terminal BE2 of this second voltage limiting module, but also an internal node configured to output, during the operation of the integrated circuit, the internal power supply voltage IVcc.

The second voltage limiting circuit, and consequently the second voltage limiting module LPCL, is configured to be passed through, in the presence of a positive electrostatic discharge on the second pad PVcc, by a current lower than the current passing the first voltage limiting module PCL.

This is due here to the presence of the resistor R.

Figure 3:
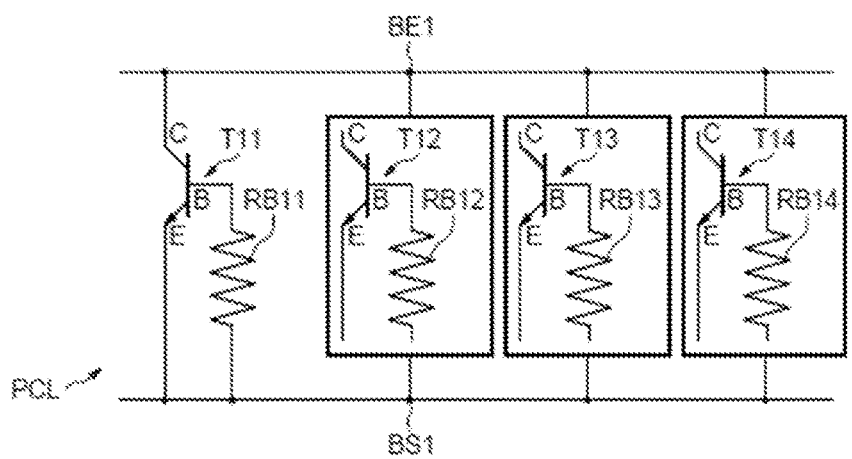
FIGS. 3 and 4 illustrate embodiments of a voltage limiting module.

Reference is now made more particularly to FIG. 3 to describe an embodiment of the first voltage limiting module PCL.

This circuit module includes N1 similar blocks (N1=4) connected in parallel between the first input terminal BE1 and the first output terminal BS1.

Each block includes a lateral bipolar transistor NPN referenced T11, respectively T12, T13 and T14.

For simplification purposes, only the first block including the transistor T11 will be described here.

The collector C of transistor T11 is connected to first input terminal BE1 while the transmitter E of this transistor T11 is connected to the output terminal BS1.

The base B of the transistor T11 is connected to the output terminal BS1 via a base resistor RB11.

Figure 4:
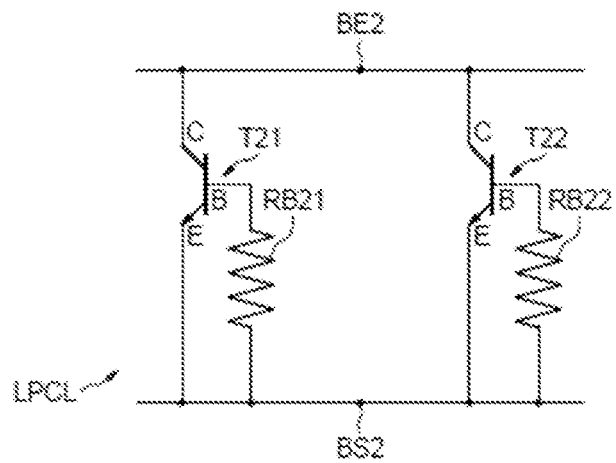

FIG. 4 illustrates an embodiment of the second voltage limiting module LPCL.

As shown in this FIG. 4, the structure of the second voltage limiting module LPCL is here identical to the structure of the first module PCL, but the size of the second module LPCL is smaller than that of the first module PCL. Indeed, the second module LPCL here includes only two lateral transistors NPN T21 and T22 which are connected in parallel between the input terminal BE2 and the output terminal BS2.

In a manner similar to what has been described with reference to FIG. 3, the collector C of each transistor T21, T22 is connected to the input terminal BE2 and the transmitter E of each transistor is connected to the output terminal BS2.

The bases B of the two transistors T21, T22 are respectively connected to the output terminal BS2 via two base resistors RB21 and RB22.

In order to have a smaller size than that of the first voltage limiting module PCL, the second L voltage limiting module PCL can include N2 lateral bipolar transistors with N2 less than N1 (N2=2 in this example).

The second voltage limiting module LPCL has a smaller size because, as will be seen in more detail below, it is configured, in the presence of a positive electrostatic discharge on the second pad PVcc, to be passed through by a current which is lower than that passing through the first voltage limiting module PCL.

The trigger threshold of each of these two modules PCL and LPCL is theoretically similar and is, for example, in the range of 7 volts which corresponds to the avalanche voltage of the diode N+P between the collector and the base of each bipolar transistor.

More specifically, when in the presence of an electrostatic discharge, the avalanche voltage of the collector-base junction is reached, the bipolar transistor begins to conduct. As a result, the voltage on the base thereof increases and when the voltage on the base reaches the threshold of the bipolar transistor, i.e., in the range of 0.6 volts, the latter becomes conductive and there is therefore a conduction between the collector and the transmitter of the bipolar transistor.

At this instant, the corresponding voltage limiting module is conductive.

And, the voltage present at the input terminal of the voltage limiting module is clipped to a value in the range of 7 volts.

However, in practice, due in particular to the high current which passes through the first voltage limiting module PCL, the voltage present at the first input terminal BE1 of this first voltage limiting module PCL may be greater than 7 volts.

Nevertheless, the voltage on the input terminal BE2 and therefore on the internal node which is connected to the internal power supply pad of the integrated circuit domain, remains limited to about 7 volts due to the weaker current which passes through this second voltage limiting module LPCL.

This will be explained in more detail below.

Reference is now made more particularly to FIGS. 5-9 in order to describe examples of implementations of the method corresponding to examples of operation of the protection circuit MPESD.

Figure 5:
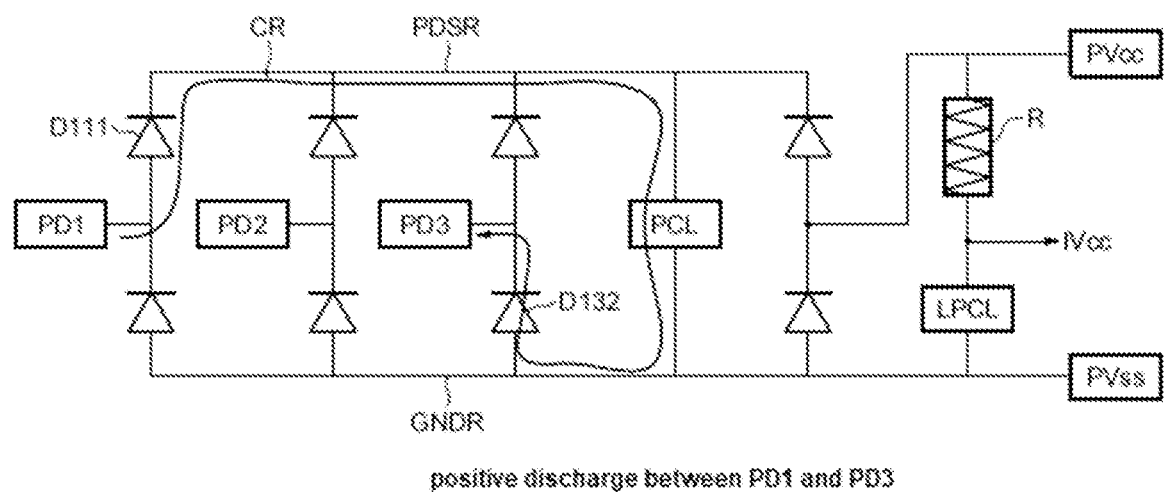
FIG. 5 illustrates a discharge path of a current resulting from a positive electrostatic discharge.

FIG. 5 illustrates the discharge path of the current CR resulting from a positive electrostatic discharge between the first pad PD1 and the first pad PD3.

More specifically, the current CR from the first pad PD1 passes through the diode D111 then circulates on the first discharge rail PDSR before passing through the first voltage limiting module PCL and circulating on the second discharge rail GNDR before passing through the first diode D132 to reach the pad PD3.

As a result, the voltage on the first pad PD1 (referenced relative to the voltage on the first pad PD3) is, in the presence of the positive discharge ESD, limited to the trigger voltage of the first voltage limiting module increased by the threshold voltages of two diodes, i.e., in the range of 8.2 volts in theory.

Figure 6:
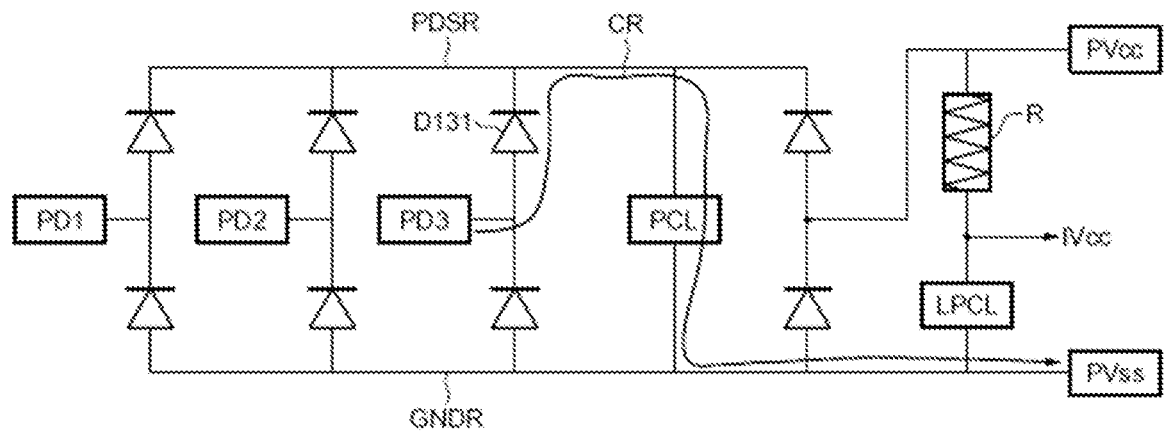
FIG. 6 illustrates a discharge path of a current resulting from a positive electrostatic discharge.

FIG. 6 illustrates the discharge path of the current CR resulting from a positive electrostatic discharge between the first pad PD3 and the third pad PVss.

This time, the current CR resulting from this positive discharge leaves the first pad PD3 then passes through the first diode D131, circulates on the first discharge rail PDSR and passes through the first voltage limiting module PCL before circulating on the second discharge rail GNDR to be reinjected into the third pad PVss.

And, here again, the voltage on the pad PD3 (referenced relative to the voltage on the third pad PVss) is limited to the trigger voltage of the first voltage limiting module increased by the threshold voltage of a diode, i.e., in the range of 7.6 volts in theory.

Figure 7:
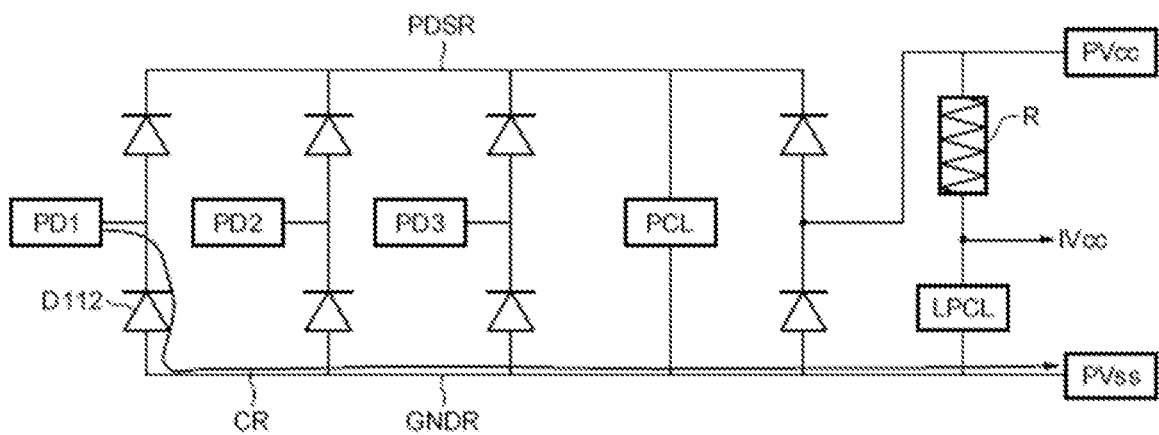
FIG. 7 illustrates a discharge path of a current resulting from a negative electrostatic discharge.

FIG. 7 illustrates the discharge path of the current CR resulting from a negative discharge between the first pad PD1 and the third pad PVss.

This time, the current CR is injected into the second discharge rail GNDR through the diode D112 so as to be injected into the third pad PVss.

This time, the voltage present on the first pad PD1 (referenced relative to the voltage on the third pad PVss) is limited to the opposite of the threshold voltage of a diode, i.e., −0.6 volts.

Figure 8:
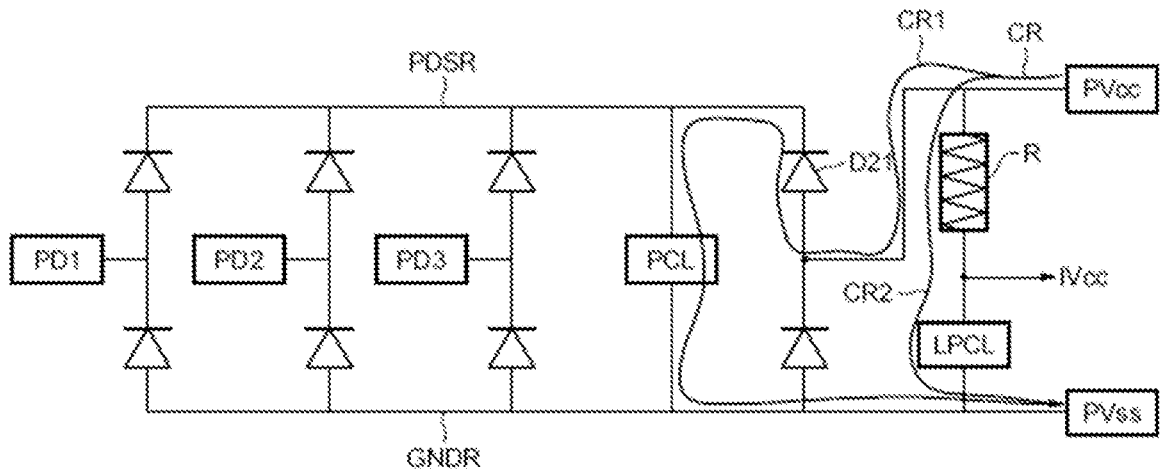
FIG. 8 illustrates a discharge path of a current resulting from a positive electrostatic discharge.

FIG. 8 illustrates the discharge path of the current CR resulting from a positive discharge between the second power supply pad PVcc and the third pad PVss.

As shown in this FIG. 8, the current CR from the second pad PVcc is divided into a first current CR1 which passes through the second diode D21 before passing through the first voltage limiting module to return to the third pad PVss, and into a second current CR2 which passes through the second voltage limiting circuit, that is to say the resistor R and the second voltage limiting module LPCL, before being also injected into the third pad PVss.

Figure 9:
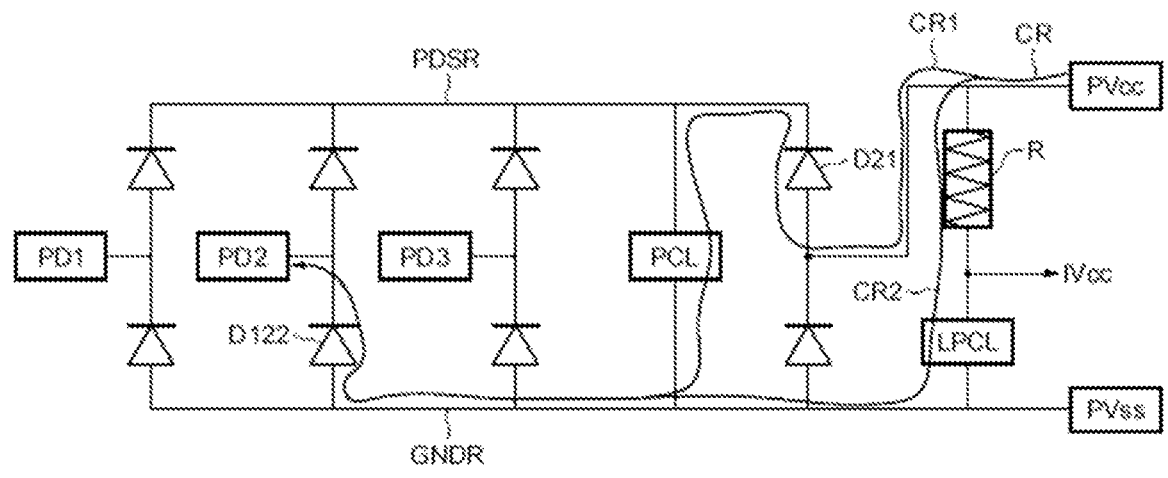
FIG. 9 illustrates a current distribution in the case of a positive discharge.

This current distribution is also found in the case of a positive discharge between the second pad PVcc and any one of the first pads, for example the first pad PD2 as illustrated in FIG. 9.

More specifically, the current CR, from the second pad PVcc is subdivided into a first current CR1 and into a second current CR2.

The first current CR1 passes through the second diode D21 then the first current limiting module PCL before being reinjected into the first pad PD2 through the second discharge rail GNDR and the first diode D122.

The second current CR2 passes through the resistor R, then the second voltage limiting module LPCL before circulating on the second discharge rail GNDR and being reinjected into the first pad PD2 through the first diode D122.

In the examples illustrated in FIG. 8 and in FIG. 9, the second current CR2 is lower than the first current CR1 as will now be explained more particularly with reference to FIG. 10.

Figure 10:
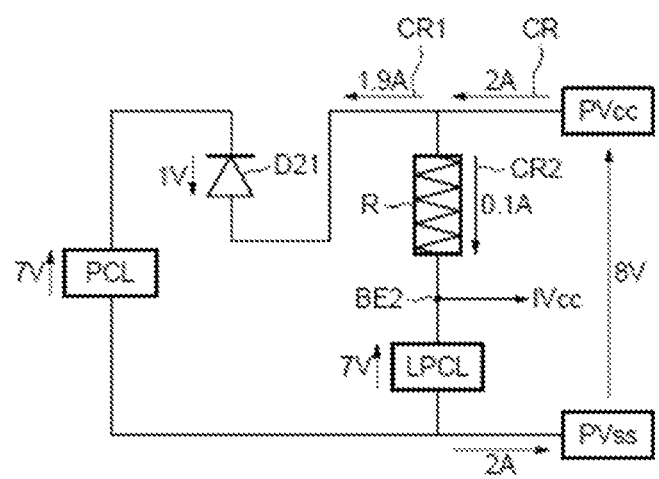
FIG. 10 illustrates a discharge path for a positive discharge.

FIG. 10 illustrates the case of a positive electrostatic discharge on the PVcc pad, this discharge occurring between the pad PVcc and the pad PVss. It is assumed here that this discharge has a level of 3 kV HBM which corresponds to a current peak of 2 amperes (3000 volts/1500 Ohms).

The current CR resulting from this discharge is therefore equal, at its peak, to 2 amperes.

The resistance R is here equal to 10 Ohms.

It is assumed that the voltage drop at the terminals of each of the voltage limiting modules PCL and LPCL is equal to 7 volts (which corresponds to their theoretical trigger threshold) and that the voltage drop at the terminals of the second diode D21 in direct conduction is equal to 1 volt.

As a result, the voltage drop through the resistor R is equal to 1 volt and consequently the current CR2 passing through the resistor R as well as the second voltage limiting module LPCL is equal to 100 milliamperes.

The first current CR1 passing through the first voltage limiting module PCL is therefore equal to 1.9 A.

It is therefore shown on this diagram that in the presence of the electrostatic discharge, the voltage on the pad PVcc is clipped to a value (here 8 volts) which is greater than the value of the voltage at the node BE2 and therefore at the input pad of the internal power supply voltage of the domain which is here equal to 7 volts.

In practice, given the high current passing through the first voltage limiting module PCL, the voltage clipped by this first voltage limiting module may in some cases be greater than this theoretical value of 7 volts and reach for example 8 volts which would then lead at a clipped voltage in the range of 9 volts on the second power supply pad PVcc.

On the other hand, given the lower current CR2 passing through the second voltage limiting circuit, due to the presence of the resistor, the voltage at the node BE2 remains clipped at around 7 volts.

With regard to the value of the resistance R, the higher it is, the lower the current CR2 and the more the voltage at the node BE2 is clipped around the theoretical trigger threshold of the voltage limiting module LPCL, in this case 7 volts.

The lower the resistance R, the higher the current CR2 and the voltage at the node BE2 can then be possibly clipped to a slightly higher value, for example around 7.5 volts.

It is also necessary to take into account the value of the internal power supply voltage IVcc during the operation of the integrated circuit given the voltage drop at the terminals of the resistor R.

Thus, if the domain DMN includes an EEPROM memory circuit, then a resistance of 10 Ohms is sufficient, but if one took a resistance of 1 KOhms, then the voltage IVcc would collapse due to the excessive voltage drop at the terminals of the resistance R.

In contrast, if the domain DMN includes a microprocessor circuit which can consume up to about 20 mA, then it is necessary to take a resistance R which is lower than 1 Ohm.

Also, the person skilled in the art will be able to adjust the value of the resistance R taking into account the considered application to obtain a good ESD protection at the node BE2 by avoiding an excessive drop in the internal power supply voltage IVcc.

During the operation of the integrated circuit, the voltage on each first pad PDi, referenced relative to ground, is clipped at the trigger threshold of the first voltage limiting module PCL increased by the threshold voltage of a diode (for example 0.6V). This clipping does not involve the power supply voltage Vcc due to blocking diode D21. This is the reason why the voltage on each first pad can rise well above the voltage Vcc+0.6V, which is in particular interesting when the integrated circuit is connected on an I²C bus together with other integrated circuits and that one of the integrated circuits is stopped (Vcc=0V).

The invention is not limited to the implementations and embodiments which have just been described, but encompasses all variants thereof.

Thus, it would be possible to replace the resistor R by a short-length N-type box by using the saturation of electron mobility under a strong electric field.

Similarly, the lateral bipolar transistors present within the voltage limiting modules could possibly be replaced by "MOSSWI" type switches, although less advantageous in terms of size requirement.

In certain applications, the domain of the integrated circuit may comprise one or more output stages of the "push-pull" type. However, powering this or these output stages from a single node BE2 can lead to the detrimental appearance of undervoltage peaks on this node BE2.

Also, in this case, it would be possible to provide for example K (K=2 for example) second voltage limiting circuits, which are connected in parallel between the second pad PVcc and the third pad PVss.

The internal node BE2 of one of these second voltage limiting circuits would be used to supply the domain of the integrated circuit with the exception of the output stage(s) of the "push-pull" type, while the other second voltage limiting circuit would be used to power only this or these output stages of the "push-pull" type.

Of course, in other applications, it is possible to choose K greater than two.

It would also be possible in some cases to have several second pads and several third pads.

All second pads would be connected to the terminal BCM (FIG. 2) so as to be able to reinject, into the first voltage limiting module PCL which remains unique, and all third pads would be connected to the anode of the second diode D22 (FIG. 2).

But each second pad would be associated with a second voltage limiting circuit which would be specific thereto, connected between this second pad and a corresponding third pad and whose internal node BE2 would output an internal power supply voltage specific to this second voltage limiting circuit.

It would also be possible for each second pad to be associated with M (M being greater than 1) second voltage limiting circuits which would be specific thereto, connected in parallel between this second pad and a corresponding third pad, and respectively outputting M internal power supply voltages, M possibly being identical or different for each second pad/third pad pair.

The invention claimed is:

1. An integrated circuit, comprising:
several first signal input and/or output pads, wherein a domain of the integrated circuit is coupled to said first signal input and/or output pads;
at least one second pad configured to receive a first respective power supply voltage;
at least one third pad configured to be coupled to a cold feed point; and
a circuit for protecting said domain against electrostatic discharge including:
a first voltage limiting module having a first input terminal which is electrically coupled to each first signal input and/or output pad by a first diode mounted so as to be reverse biased during the operation of the integrated circuit;
wherein the first voltage limiting module is configured to be mounted to be conductive between each first signal input and/or output pad and said at least one third pad during a positive electrostatic discharge on one of the first signal input and/or output pads;
at least one second voltage limiting circuit electrically coupled between said at least one second pad and said at least one third pad;
wherein each second voltage limiting circuit is configured to be mounted to be conductive between the corresponding at least one second pad and the corresponding at least one third pad during a positive electrostatic discharge on the at least one second pad, the second voltage limiting circuit having an internal node configured to output a second power supply voltage to said domain, and configured, in the presence of a positive electrostatic discharge on the corresponding at least one second pad, to be passed through by a current which is lower than the current passing through the first voltage limiting module; and
a second diode which is electrically connected between said first input terminal and said at least one second pad so as to be forward-biased between said at least one second pad and the first input terminal of the first voltage limiting module during a positive discharge on the corresponding at least one second pad.

2. The integrated circuit according to claim 1, wherein the protection circuit comprises:

first pairs of first diodes which are connected in parallel and respectively associated with the first signal input and/or output pads, each first pair including two first diodes connected in series in a same direction, a common terminal of the two first diodes being coupled to the corresponding first signal input and/or output pad;

wherein the first voltage limiting module is connected in parallel with the first pairs of diodes;

a second pair of second diodes connected in parallel with the first voltage limiting circuit module, the second pair including two second diodes connected in series in a same direction as the first diodes, a common terminal of the two second diodes being electrically coupled to said at least one second pad;

wherein each second voltage limiting circuit includes a second voltage limiting module connected in series with a resistive element, a common terminal between the resistive element and the second voltage limiting module forming a second input terminal for the second voltage limiting module as well as said internal node;

wherein anodes of all diodes having their cathode connected either to one of the first signal input and/or output pads or to said at least one second pad are electrically coupled to said at least one third pad.

3. The integrated circuit according to claim 2, wherein the circuit for protecting comprises:

a first discharge rail coupled to said input terminal of the first voltage limiting module and to cathodes of all diodes having their anode coupled either to one of the first signal input and/or output pads or to the at least one second pad; and a second discharge rail coupled to the at least one third pad and to the anodes of all diodes having their cathode connected either to one of the first signal input and/or output pads or to said at least one second pad.

4. The integrated circuit according to claim 2, wherein the first voltage limiting module and said at least one second voltage limiting module have a similar structure.

5. The integrated circuit according to claim 4:

wherein the first voltage limiting module includes at least one first lateral bipolar transistor having a collector forming said first input terminal, an emitter coupled to the corresponding at least one third pad and a base connected to the corresponding at least one third pad by a first base resistor; and wherein each second voltage limiting module includes at least one second lateral bipolar transistor having a collector forming said second input terminal, an emitter coupled to the corresponding at least one third pad and a base connected to the corresponding at least one third pad by a second base resistor.

6. The integrated circuit according to claim 5, wherein said at least one second voltage limiting module has a space requirement which is smaller than that of the first voltage limiting module.

7. The integrated circuit according to claim 5, wherein the first voltage limiting module includes N1 first transistors in parallel, N1 being greater than 1 and said at least one second voltage limiting module includes N2 second transistors in parallel, N1 being greater than N2.

8. The integrated circuit according to claim 1, wherein said domain includes a non-volatile memory circuit.

9. A method, comprising:

in the presence of a positive electrostatic discharge on one of first signal input and/or output pads coupled to a domain of an integrated circuit, limiting voltage on the first signal input and/or output pad by circulating the current resulting from the positive electrostatic discharge through a first voltage limiting module;

in the presence of a positive electrostatic discharge on a second pad configured to receive, during operation of the integrated circuit, a first power supply voltage, limiting voltage on an input terminal of at least one second voltage limiting module by distributing current resulting from the positive electrostatic discharge into:

a first current circulating in the first voltage limiting module and in a blocking diode coupled between the second pad, the first signal input and/or output pad and the input of the first voltage limiting module; and at least one second current circulating in said at least one second voltage limiting module, said at least one second current being lower than the first current; and during the operation of the integrated circuit, outputting, to said domain, at least one second power supply voltage equal to the voltage present at said input terminal of said at least one second voltage limiting module.

10. The method according to claim 9, wherein said at least one second current also circulates in a resistive element coupled between said input terminal of the corresponding second current limiting module and the second pad.

11. An integrated circuit providing protection against electrostatic discharge, comprising:

a power supply voltage pad;

a ground reference pad;

a signal pad;

a first diode having an anode coupled to the signal pad and a cathode coupled to a first intermediate node;

a second diode have an anode coupled to the power supply voltage pad and a cathode coupled to the first intermediate node;

a first voltage limiting circuit having a first terminal coupled to the first intermediate node and a second terminal coupled to the ground reference pad, said first voltage limiting circuit configured to conduct a first current from the first terminal to the second terminal in response to a positive electrostatic discharge at the signal pad;

a resistance coupled between the power supply voltage pad and a second intermediate node;

a second voltage limiting circuit having a third terminal coupled to the second intermediate node and a fourth terminal coupled to the ground reference pad, said second voltage limiting circuit configured to conduct a second current less than the first current from the third terminal to the fourth terminal in response to a positive electrostatic discharge at the power supply voltage pad; and wherein a power supply voltage for a circuit domain is output at the second intermediate node.

12. The circuit of claim 11, wherein said first voltage limiting circuit comprises a first lateral bipolar transistor having a collector connected to first terminal, an emitter connected to the second terminal and a base connected to the second terminal by a first base resistor.

13. The circuit of claim 11, wherein said second voltage limiting circuit comprises a second lateral bipolar transistor having a collector connected to the third terminal, an emitter connected to the fourth terminal and a base connected to the fourth terminal by a second base resistor.

* * * * *